T. B. LYNCH.
ELECTRIC SWITCH AND MOUNTING THEREFOR.
APPLICATION FILED AUG. 5, 1915.

1,207,952.

Patented Dec. 12, 1916.

Witness
Emens B. Wisner

Inventor
THOMAS B. LYNCH

By
Charles E. Wisner
Attorney

UNITED STATES PATENT OFFICE.

THOMAS B. LYNCH, OF DETROIT, MICHIGAN, ASSIGNOR OF ONE-HALF TO WILLIAM C. MORGAN, OF DETROIT, MICHIGAN.

ELECTRIC SWITCH AND MOUNTING THEREFOR.

1,207,952.　　　　Specification of Letters Patent.　　Patented Dec. 12, 1916.

Application filed August 5, 1915. Serial No. 43,727.

*To all whom it may concern:*

Be it known that I, THOMAS B. LYNCH, a citizen of the United States, residing at Detroit, county of Wayne, State of Michigan, have invented a certain new and useful Improvement in Electric Switches and Mountings Therefor, and declare the following to be a full, clear, and exact description of the same, such as will enable others skilled in the art to which it pertains to make and use the same, reference being had to the accompanying drawings, which form a part of this specification.

This invention relates to electric switches and mounting therefor, and its general object is a switch and mounting for use in the circuits controlling the dash or side-lights of an automobile or the circuit controlling the signal horn. Switches for this purpose have heretofore been placed on the steering wheel or at the side of the body of the automobile in such positions that the driver must remove his hand from the steering wheel to operate the button of the switch and in so doing releases control of the car to some extent.

In the invention herein disclosed the control levers by means of which the time of ignition is advanced or retarded and by means of which the engine is throttled are utilized as a mounting. These levers, in the usual automobile, are either on the upper or the lower side of the steering wheel and by forming or providing the control levers with means for supporting the switch in a manner to extend the levers to the steering wheel rim, the switch is brought within easy reach of the fingers of the operator without the necessity of releasing his hold upon the steering wheel.

A further object is a switch mounting of the character stated, that is inexpensive to manufacture and adapted to support the switch and the wires of the connecting circuit.

These objects and the several novel features of construction are hereinafter more fully described and claimed and shown in the accompanying drawings in which—

Figure 1:
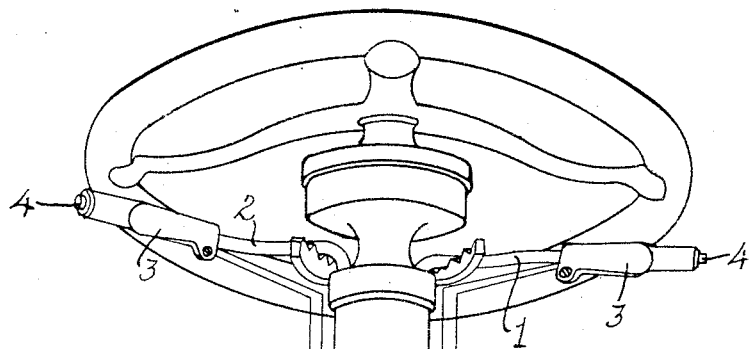
Figure 2:
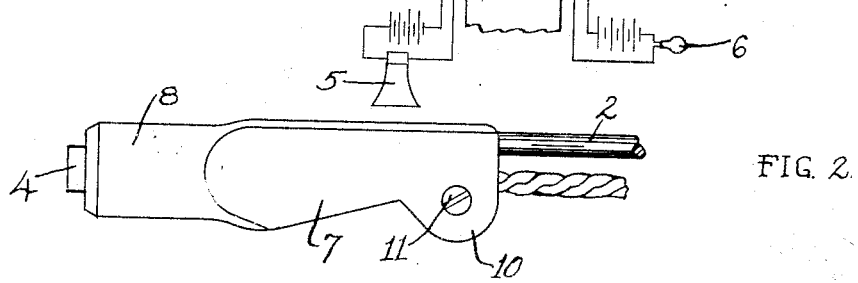
Figure 3:
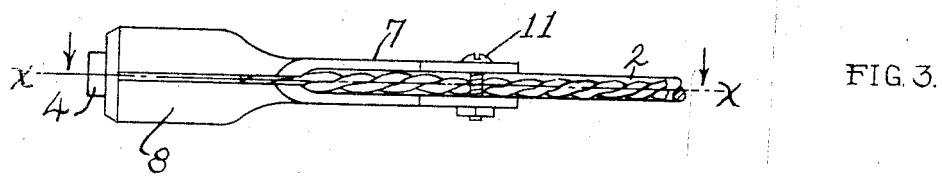
Figure 4:
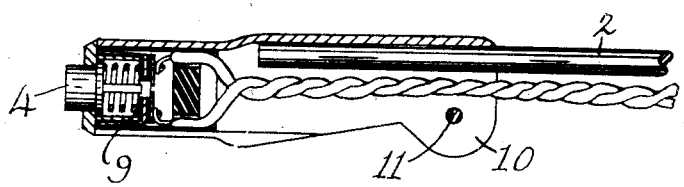

Figure 1 is a perspective view of a steering wheel head showing the control levers and switches thereon. Fig. 2 is an enlarged side elevation of the switch and mounting. Fig. 3 is an edge view thereof. Fig. 4 is a longitudinal section of the mounting showing the switch taken on line x—x of Fig. 3.

Similar characters refer to similar parts throughout the drawing and specification.

In Fig. 1 is shown a well known steering head such as are used on the Ford automobile, the lever 1 being the lever controlling the timing of the ignition of the engine, and the lever 2 controlling the throttle valve of the engine. These levers in this instance are placed on the lower side of the steering wheel and are provided with switch mountings or holders 3, 3, providing an extension for the levers to bring the switch button 4 in the end thereof directly beneath the rim of the steering wheel in position to be readily operated by the hand of the driver while on the steering wheel. The electric wiring to the switch on the lever 2 may connect with an electric horn indicated diagrammatically at 5 and the electric circuits connecting with the switch on the lever 1 may control the dash light as indicated diagrammatically at 6 or other electric devices may be controlled by the circuits as may be desired.

In each instance the lever 1 or 2 provides a support for the switch case 7 which is preferably formed of a single piece of sheet metal and attached to the lever as indicated, having one end 8 substantially cylindrical in form to receive the switch 9 shown in Fig. 4, to the terminals of which the electric circuit is attached. The end opposite the switch is comparatively flat in shape, the two adjacent sides being spaced apart slightly to receive the end of the lever as indicated in Fig. 3, and providing a conduit for the wires leading to the switch. The two adjacent sides of the switch case have a depending part 10 apertured to receive the screw 11 by means of which the two side walls may be clamped together to engage the lever and prevent displacement thereof.

It is to be understood that the switch is adaptable for use with levers of various types either on the upper side of the steering wheel or below the same as shown, the essential characteristic being that the switch mounting forms an extension of the lever bringing the same within easy reach of the hand of the operator when on the steering wheel rim so the switch may be readily operated without releasing the hold upon the wheel.

Having thus briefly described my invention and its utility, what I claim and desire to secure by Letters Patent of the United States is—

1. In combination with a steering wheel and adjacent control lever for the operating parts of an automobile, a switch mounting providing an extension for said lever terminating adjacent the steering wheel rim, an electric switch carried by said mounting, and means for operating the switch.

2. In combination with a steering wheel and adjacent control lever for the operating parts of an automobile, a switch mounting providing an extension for said lever terminating adjacent the steering wheel rim, an electric switch carried by the mounting, a normally open electrical circuit, the wires being supported by the mounting and connecting with the switch terminals, and a button in the end of the mounting for closing the circuit.

3. In combination with a steering wheel and adjacent control lever for the operating parts of an automobile as described, a switch mounting adapted to be detachably secured to the lever providing an extension therefor terminating adjacent the steering wheel rim, an electric switch carried by the mounting, an electrical circuit, the wires of which are supported by the mounting and connected with the terminals of the switch, and a button in the end of the mounting for operating the switch.

4. A switch mounting providing an extension for a lever comprising a split case having a cylindrical end for receiving the switch, the opposite end being flattened, the side walls being spaced to receive the lever and the electric wiring for the switch, and means for clamping the case on the lever.

5. In combination with a steering wheel and adjacent control lever for the operating parts of an automobile, a switch mounting providing an extension for said lever and provided with a hollow end portion terminating near the steering wheel rim, and an electric switch in the end of said hollow portion, said hollow portion being adapted to provide a conduit for the wires leading to the switch.

In testimony whereof, I sign this specification.

THOMAS B. LYNCH.